United States Patent [19]

Pineau

[11] Patent Number: 5,428,787
[45] Date of Patent: Jun. 27, 1995

[54] DISK DRIVE SYSTEM FOR DYNAMICALLY SELECTING OPTIMUM I/O OPERATING SYSTEM

[75] Inventor: Gerard Pineau, Longmont, Colo.

[73] Assignee: Conner Peripherals, Inc., San Jose, Calif.

[21] Appl. No.: 21,244

[22] Filed: Feb. 23, 1993

[51] Int. Cl.⁶ .............................................. G06F 9/24
[52] U.S. Cl. .................................. 395/700; 395/425; 395/500
[58] Field of Search ..................... 395/425, 500, 700

[56] References Cited

PUBLICATIONS

Walsh, Brian, *Making Cents of RAID*, Network Computing, Oct. 15, 1993, p. 32 (copy from DIALOG file 16).

*Primary Examiner*—David L. Robertson
*Attorney, Agent, or Firm*—Fliesler, Dubb, Meyer & Lovejoy

[57] ABSTRACT

A disk drive system for use with a host processor where the host processor employs either a look ahead command set or a tag queuing command set for communicating with the disk drive system. The disk drive system comprises a first storage means for storing an optimized look ahead operating system and an optimized tag queuing operating system; a first means connected to the first storage means for initially retrieving one of the operating systems stored in the first storage means; a second storage means for storing the initial operating system retrieved by the first means; a second means for detecting the condition that a command issued by the host processor is associated with the operating system that was not initially retrieved by the first means and stored in the second means; and a third means for responding to the second means detecting the condition by retrieving the operating system that was not initially retrieved by the second means from the first storage means, for storing the newly retrieved operating system in the second storage means in place of the initially stored operating system and for transferring control to the newly stored operating system.

8 Claims, 2 Drawing Sheets

DISK DRIVE SYSTEM FOR DYNAMICALLY SELECTING OPTIMUM I/O OPERATING SYSTEM

A portion of the disclosure of this patent document contains material which is subject to copyright protection. The copyright owner has no objection to the facsimile reproduction by anyone of the patent documents or the patent disclosure as it appears in the U.S. Patent and Trademark Office patent file or records, but otherwise reserves all copyright rights whatsoever.

BACKGROUND OF THE INVENTION

1. Field of the Invention

The invention relates to disk drive systems which have a controller which employs a look ahead operating system for processing a look ahead command set and a tag queuing operating system for processing a tag queuing command set issued by a host processor.

2. Description of the Related Art

A disk drive system will perform best using a control operating system that has been optimized to the command set that is used by the host processor for communicating with the disk drive system.

A first command set used by host processors is the look ahead command set which requires the host processor to await the completion of a command issued to the disk drive system before issuing the next command and for the disk drive system to perform multiple threaded sequential operations. In this case the disk drive system will perform best by using a look ahead operating system that is optimized to perform n-segment look ahead operations that anticipate what the next command from the host computer will be and will pre-fetch data associated with the next anticipated command to avoid latencies. The use of the optimized look ahead operating system in communicating with the host processor will increase the computing system's performance.

A second command set used by host processors is the tag queuing command set where the host computer issuing multiple commands at one time to the disk drive system and the disk drive system receives and store the command for subsequent processing of the commands by the disk drive system. When the tag queuing command set is used, it is no longer necessary for the disk drive system to anticipate what command the host processor will next issue because with more than one command stored in the queue in the disk drive system, the disk drive system will know exactly what the host computer wants to do next. Therefore, the disk drive system will best operate using an optimized tag queue operating system to take advantage in the processing of the multiple outstanding commands so as to boost the performance of the system and to not waste time doing unnecessary look ahead operations.

Disk drive system manufacturers may produce an optimized disk drive system for use with host processors employing the look ahead command set and an optimized disk drive system for use with host processors employing the tag queuing command set. This approach has the undesirable effect of requiring that two models of the same disk drive system must be marketed where the only difference is the operating system used in communicating with the host processor. Therefore disk drive system manufacturers have endeavored to provide a disk drive system which is capable of responding to both the look ahead command set and the tag queuing command set. However, in attempting to provide a single operating system so as to make the disk drive system transparent to the command set being used by the host computer, the optimization of the operating system for both of the command sets had to be compromised. This compromise results in the decrease in efficiency of the system from the system efficiency that could have been obtained if the optimum operating systems could have been used for the command sets.

SUMMARY OF THE INVENTION

It is an object of the invention to provide a disk drive system which uses the optimized operating system for the look ahead command set and the tag queuing command set.

Briefly, the invention is directed to a disk drive system in which the executable optimize look ahead operating system for the look ahead command set and optimize tag queuing operating system for the tag queuing command set are both stored in reserved cylinder on the media within the disk drive system. The reserve cylinders are not normally accessible to the user except during the write buffer download micro command. The look ahead operating system is optimized for multiple threaded look ahead operation. The tag queuing operating system is optimized for (1) preprocessing received commands and then placing the pre-processed command on hold until the system facilities are available to complete the pre-processed command and (2) for reordering the received commands from the sequence the commands were received into a sequence that minimizes system latencies thereby improving system performance. The disk drive system, at power up, will load the look ahead operating system from the media. The disk drive system will operate with the look ahead operating system as long as no tag queuing commands are received from the host processor. When a tag queuing command is received, that command will be processed as a look ahead command by the look ahead operating system and the disk drive system will load the tag queuing operating system from the media to replace the look ahead operating system such that all further commands received from the host processor will be processed using the tag queuing operating system.

It is expected that the host processor will normally only utilize one of the two command sets and therefore the disk drive system will process only one tag queuing command by the look operating system before the optimized tag queuing operating system is loaded and made available for processing the tag queuing command issued by the host processor.

An advantage of the present invention is that the latest version of the optimized look ahead operating system and the optimized tag queuing operating system may be loaded into the proper location on the media. In this manner the system may always operate at the latest version the optimized operating system for both command sets, thereby maintaining the expected efficiency from the disk drive system with regard to executing commands received from the host processor.

BRIEF DESCRIPTION OF THE DRAWINGS

The invention will be described with respect to the particular embodiments thereof and references will be made to the drawings, in which.

DESCRIPTION OF THE PREFERRED EMBODIMENTS

Figure 1:
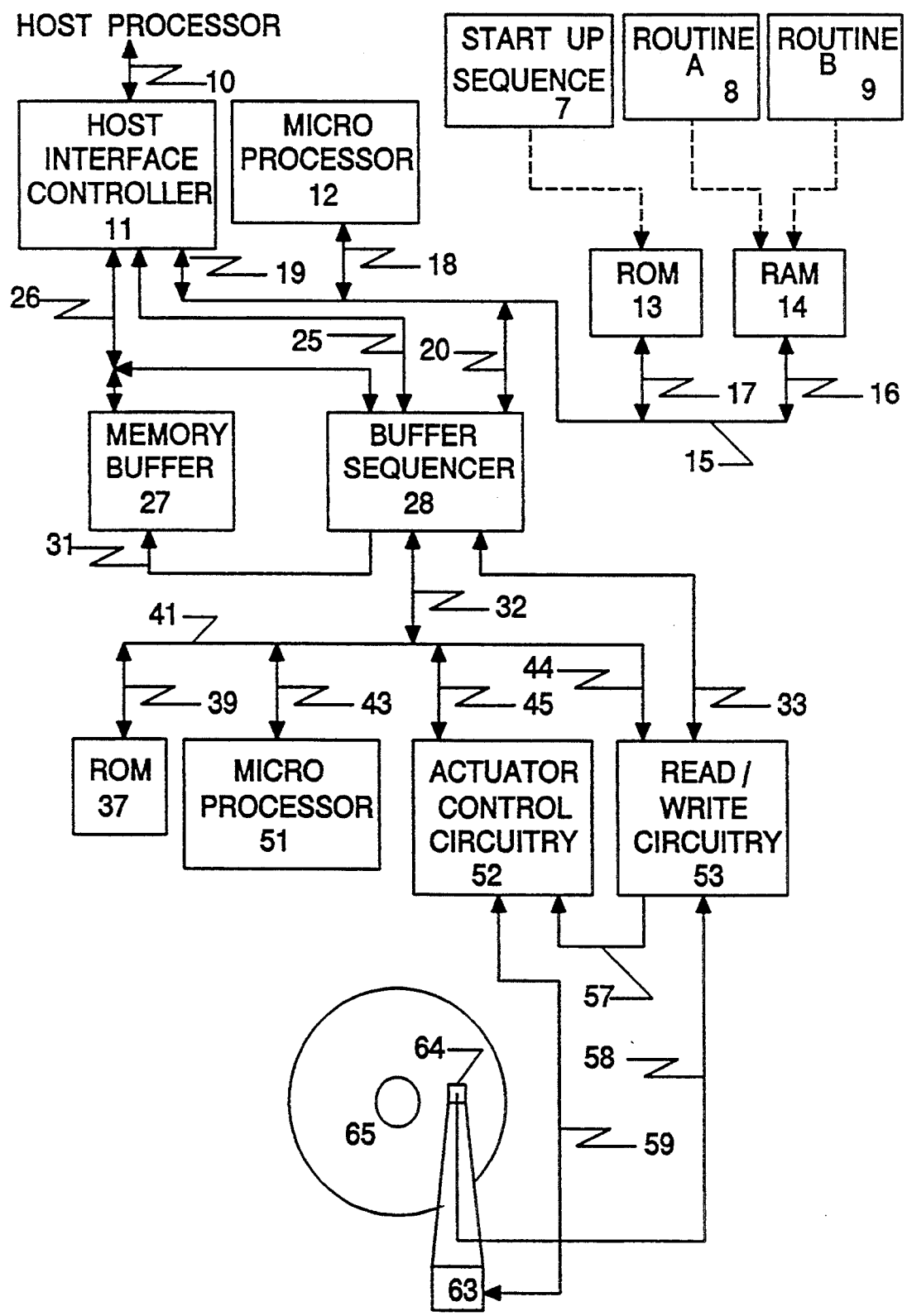
FIG. 1 is a disk drive system embodying the invention.

FIG. 1 shows a disk drive system which embodying the invention. The disk drive system comprises microprocessor 12 which operates under program operating systems stored in ROM 13 and RAM 14. Microprocessor 12 controls host interface controller 11 for the receiving and sending of data and commands from and to the host processor. Microprocessor 12 communicates with buffer sequencer 28 which controls the data flow to and from memory buffer 27 and with microprocessor 51 which implements operations associated with control words received from the host processor. Microprocessor 51 operates under programs stored within ROM 37 and instructions received from microprocessor 12. Microprocessor 51 controls actuator control circuity 52 for positioning of the actuator 63, track following and motor spin control and read/write circuity 53 for reading and writing to and from the media 65 by means of transducer 64. The use of microprocessors 12 and 51, allows the system to perform a read and/or write operation under the control of microprocessor 51 while transferring or receiving data to or from the host processor through the host interface controller under control of microprocessor 12.

The optimized look ahead operating system and tag queuing operating system are stored in dedicated cylinders on media 65. ROM 13 stores the operating system which includes routine B9, for loading the tag queuing operating system into RAM 14 whenever a tag queuing command has been received by microprocessor 12 for processing.

Figure 2:
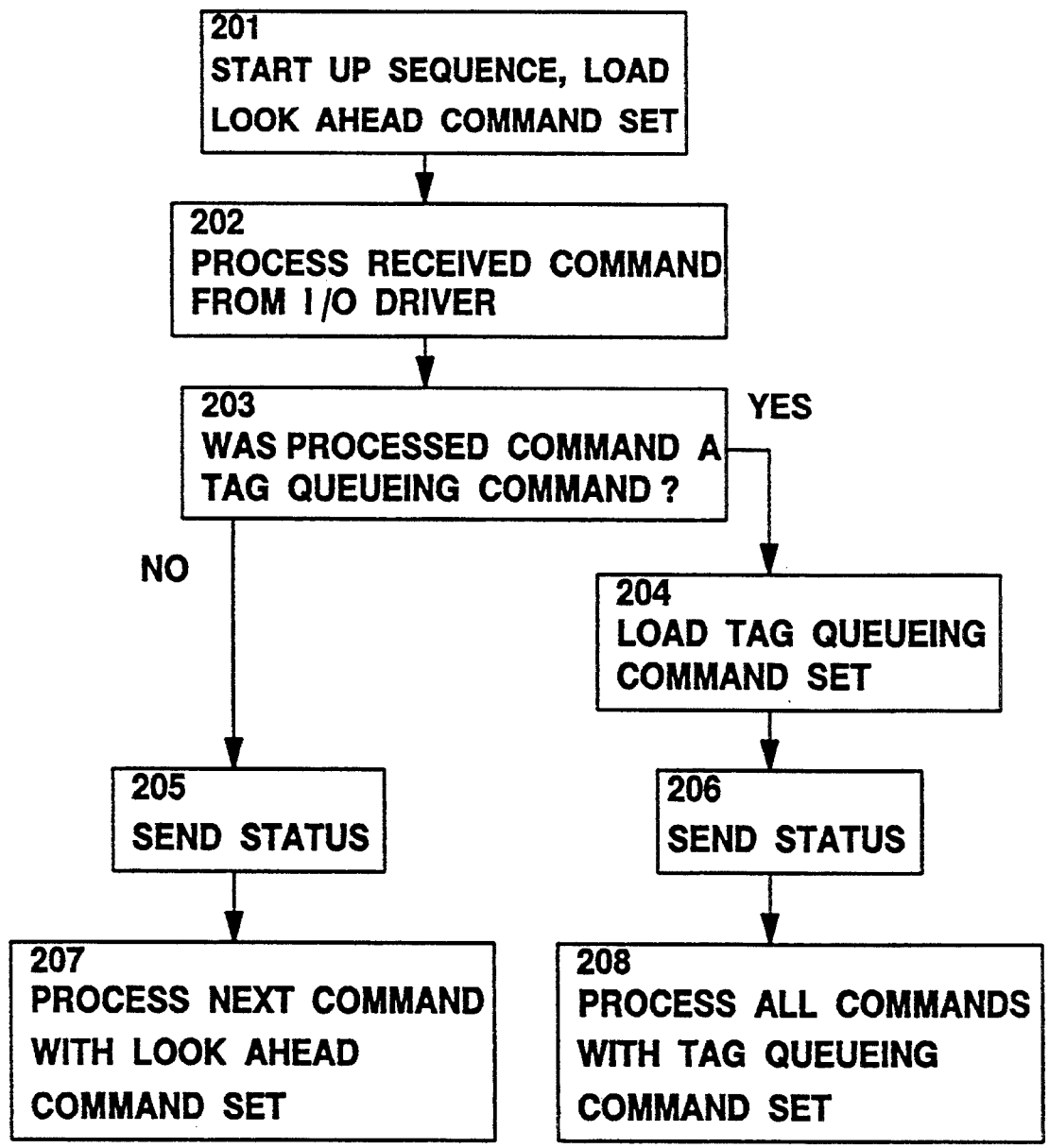
FIG. 2 is a flow chart illustrating the operation of the invention.

FIG. 2 is a flow chart which illustrates the operation of the invention within the disk drive system of FIG. 1. In step 201, when the disk drive system is powered up, the start up sequence 7 will load the look ahead operating system from media 65 into RAM 14 in anticipation of the host processor issuing a look ahead command. Upon receiving a command from the host processor through the host interface controller 11, microprocessor 12 will process that command by the look ahead operating system stored in RAM 14. In step 203, when the command is complete but before status is sent to the host processor, the look ahead operating system enters into a polling loop in preparation for receiving the next command from the host processor. Instructions in that polling loop test whether or not the instruction, that has just been completed, was a tag queuing command. In step 205, if the command was a look ahead command, then status is sent to the host processor and, in step 207, the next command received by microprocessor 12 will be processed in accordance with the look ahead operating system stored in RAM 14.

In step 204, if the command that had been processed was a tag queuing command then the system will branch to routine B9 in ROM 13 for loading the tag queuing operating system into RAM 14. In step 206, once the tag queuing operating system has been successfully loaded into RAM 14 in place of the look ahead operating system, status is sent to the host processor. In step 208, all commands received from the host processor thereafter will be processed using the tag queuing operating system.

Routine A8 is that portion of the polling loop of the look ahead operating system that tests whether or not the command previously processed was a tag queuing command. As can be seen from routine A8 if, in fact, a tag queuing command has been sensed, the look ahead operating system will branch from the look ahead operating system to a routine QTAGPL stored in ROM 13. Routine A8 is set forth below:

|  | ROUTINE A8 | TEST FOR TAG COMMAND |
|---|---|---|
| POLL_70?: | | |
| LDAB | <S_ERNUM,Y | ;Retrieve error for SETSNS |
| BNE | POLL_75? | ;Branch if error |
| LDAA | V_TAGRCV | ;Check tag command received |
| BEQ | POLL_72? | ;Branch if not |
| COMA | | ;TAGRCV holds initiator ID |
| STAA | V_ATNFS | ;Set attention initiators |
| JMP | QTAGPL | ;Jump to change code sets. |

Routine B9 is routine QTAGPL and is set forth below. Routine B9 is invoked whenever a tag queuing command has been sensed by the look ahead operating system which results in the system bus is being held, the tag queuing operating system being loaded into RAM 14 and transfer of operations to the tag queuing operating system.

|  | ROUTINE B9 | LOAD TAG QUEUING COMMAND SET |
|---|---|---|
| QTAGPL: | | ;ROM entry for change |
| LDS | #M_STAK | ; |
| CLRA | | ; |
| STAA | V_ALGNCE | ;Clear allegiance flags |
| STAA | V_UTAGIP | ;Global flag |
| JSR | QINIT | ;Construct command q array |
| LDY | #V_CQEQF | ;Point to first CQE entry |
| LDD | #0 | ;Initialize offset entry |
| STD | <S_CHANOFF,Y | ;PROCCMD to channel |
| HALT.NITWOT | | ;Channel processor idle |
| LDAA | #5AH | ; |
| STAA | V_RAMFLAG | ;Set flag code loading |
| JSR | IPLDOK | ;Load tag queue command set |
| LDAA | #5AH | ; |
| CMPA | V_RAMFLAG | ;Set flag code loaded |
| BNE | TPLERR | ; |
| LDX | #V_EMPTY | ;Point to empty queue |
| LDY | <S_NXT,X | ;Point to first entry |
| STY | V_CURCQE | ;Store in CQE on SCSI bus |
| LDD | #0 | ; |
| STD | <S_CHANOFF,Y | ; |
| LDAA | V_TAGRCV | ; |
| STAA | <S_HBIN,Y | ;Initiator ID |
| STAA | <S_CINITBIN,Y | ;Also current initiator |
| CLRB | | ; |
| JSR | SNDSTS | ;Send status |
| LDAA | #SWP_NPROCESS | ;Set flag code changed |
| ORAA | V_SWAPFLG | ; |
| STAA | V_SWAPFLG | ; |
| JMP | RAM_START | :Process with new code |

In routine B9, the first 17 steps are used to initialize the disk drive system for the swapping of the operating systems stored in RAM 14. Instruction HALT.NIWOT is a micro code routine that ensures that processor 51 is in an idle state having finished the processing of the previous instruction. After the steps of storing the tag queuing operating system into RAM 14, instruction B9 JSR SNDSTS will send status to the host processor. After status is sent, flags are set indicating that the operating systems have been interchanged. Finally control is then passed to the tag queuing operating system, now stored in the RAM 14, for the processing of all commands received from the host processor.

The invention as described heretofore uses known digital software implementation and the microcode of routines A8 and B9 were assembled using Motorola 68Z11 Assembler, Series 5.0. It is understood that the invention can be executed by other software programs using other software languages and or assemblers. Further the invention may be implemented in hardware for example by employing a state machine to carry out the described procedures as set forth in routines A and B and as described heretofore in this specification.

While the invention has been particularly shown and described with references to the preferred embodiments thereof, it will be understood by those skilled in the art that changes in form and detail may be made therein without departing from the spirit and scope of the invention. Given the above disclosure of general concepts and specific embodiments, the scope of the protection sought is defined by the following.

What is claimed is:

1. A disk drive system for use with a host processor where said host processor employs either a look ahead command set or a tag queuing command set for communicating with said disk drive system, said disk drive system comprising:
   first storage means for storing an optimized look ahead operating system and an optimized tag queuing operating system:
      first means connected to said first storage means for initially retrieving one of said operating systems stored in said first storage means;
      second storage means for storing said initial operating system retrieved by said first means;
      second means for detecting the condition that a command issued by said host processor is associated with said operating system that was not initially retrieved by said first means and stored in said second means; and
      third means responsive to said second means detecting said condition for retrieving from said first storage means said operating system that was not initially retrieved by said second means from said first storage means, for storing said newly retrieved operating system in said second storage means and for transferring control to said newly stored operating system.

2. The disk drive system of claim 1 wherein said first storage means is a dedicated area in the magnetic media of said disk drive system.

3. The disk drive system of claim 1 wherein when said disk drive system is operating under said first retrieved operating system, said second means tests each command issued by said host after that command has been completed to determine if said completed command was a command for the operating system that was not initially retrieved.

4. The disk drive system of claim 3 wherein said third means delays the sending of status that the command was completed to the host until after control has been switched to said newly loaded operating system when said second means has determined that said completed command was a command for the operating system that was not first retrieved by said first means.

5. A disk drive system for use with a host processor where said host processor employs either a look ahead command set or a tag queuing command set for communicating with said disk drive system, said disk drive system comprising:
   first storage means for storing an optimized look ahead operating system and an optimized tag queuing operating system:
      first means connected to said first storage means for initially retrieving said look ahead operating systems stored in said first storage means;
      second storage means for storing said look ahead operating system retrieved by said first means;
      second means for detecting the condition that a command issued by said host processor is associated with said tag queuing operating system; and
      third means responsive to said second means detecting said condition for retrieving from said first storage means said tag queuing operating system from said first storage means, for storing said tag queuing operating system in said second storage means and for transferring control to said tag queuing operating system.

6. The disk drive system of claim 5 wherein said first storage means is a dedicated area in the magnetic media of said disk drive system.

7. The disk drive system of claim 5 wherein when said disk drive system is operating under said look ahead operating system, said second means tests each command issued by said host after that command has been completed to determine if that completed command was a tag queuing command.

8. The disk drive system of claim 7 wherein said third means delays the sending of status that the command was completed to the host until after control has been switched to said tag queuing operating system when said second means has determined that said completed command was a command for said tag queuing operating system.

* * * * *

UNITED STATES PATENT AND TRADEMARK OFFICE
CERTIFICATE OF CORRECTION

PATENT NO. : 5,428,787
DATED : June 27, 1995
INVENTOR(S) : Gerard Pineau

It is certified that error appears in the above-indentified patent and that said Letters Patent is hereby corrected as shown below:

```
Column 3, line 6, delete "which".
Column 4, line 44, should read --LDAA        #33h            ;--
```

Signed and Sealed this

Tenth Day of December, 1996

BRUCE LEHMAN

Attest:

*Attesting Officer*          *Commissioner of Patents and Trademarks*